United States Patent
Koo et al.

(10) Patent No.: US 7,960,952 B2
(45) Date of Patent: Jun. 14, 2011

(54) SWITCHING MODE POWER SUPPLY AND SWITCH THEREOF

(75) Inventors: Gwan-Bon Koo, Bucheon (KR); Jin-Tae Kim, Bucheon (KR); Yoo-Woong Hwang, Bucheon (KR); Kyung Oun Jang, Bucheon (KR); Jin-Woo Moon, Bucheon (KR); Sang-Hyun Lee, Goyang (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 431 days.

(21) Appl. No.: 12/148,314

(22) Filed: Apr. 18, 2008

(65) Prior Publication Data
US 2008/0258564 A1 Oct. 23, 2008

(30) Foreign Application Priority Data
Apr. 19, 2007 (KR) .................. 10-2007-0038336

(51) Int. Cl.
*G05F 1/59* (2006.01)
*H02M 3/335* (2006.01)
(52) U.S. Cl. .................................. 323/272; 363/21.18
(58) Field of Classification Search .................. 323/225, 323/268, 271, 272, 350; 363/21.12, 21.15, 363/21.17, 21.18
See application file for complete search history.

(56) References Cited

U.S. PATENT DOCUMENTS

| 5,729,443 | A | 3/1998 | Pavlin | |
|---|---|---|---|---|
| 5,859,552 | A * | 1/1999 | Do et al. | 327/170 |
| 5,903,422 | A * | 5/1999 | Hosokawa | 361/93.1 |
| 6,611,439 | B1 | 8/2003 | Yang et al. | |
| 6,665,197 | B2 | 12/2003 | Gong et al. | |
| 6,674,656 | B1 | 1/2004 | Yang et al. | |
| 7,110,270 | B2 | 9/2006 | Balakrishnan et al. | |
| 7,576,406 | B2 * | 8/2009 | Tamaki et al. | 257/526 |

* cited by examiner

*Primary Examiner* — Gary L Laxton
(74) *Attorney, Agent, or Firm* — Sidley Austin LLP

(57) ABSTRACT

A switching mode power supply and a switch thereof are provided. The switch includes a plurality of first transistors, and a second transistor that is turned on/off by a control signal that is equal to that of the plurality of first transistors and in which a second current corresponding to a first current flowing to the plurality of first transistors flows, wherein a ratio of the first current to the second current sequentially changes from a time point at which the second transistor is turned on. Therefore, a switching mode power supply and a switch thereof that can always uniformly sustain a maximum limit current flowing to the switch regardless of a level of an input voltage without including a special additional circuit can be provided.

21 Claims, 9 Drawing Sheets

SWITCHING MODE POWER SUPPLY AND SWITCH THEREOF

CROSS-REFERENCE TO RELATED APPLICATION

This application claims priority to and the benefit of Korean Patent Application No. 10-2007-0038336 filed in the Korean Intellectual Property Office on Apr. 19, 2007, the entire contents of which are incorporated herein by reference.

BACKGROUND

1. Field of the Invention

The present invention relates to a switching mode power supply and a switch thereof.

2. Description of the Related Art

A switching mode power supply (hereinafter referred to as an "SMPS") is a device that first rectifies an input AC voltage to an input DC voltage (sometimes referred to as a DC-Link voltage) and then converts the input DC voltage to an output DC voltage having a different level. In various designs and applications the output DC voltage can be higher or lower than the input DC voltage. The SMPS is generally used for electronic devices such as a battery charger of a mobile phone and an adaptor of a laptop computer.

In some SMPS, a maximum limit current $I_{LIM}$ is set. In case of a short circuit or an overload of an output terminal, when a current Id of a main switch reaches the maximum limit current $I_{LIM}$, damage to the main switch due to the excessive current is prevented by turning off the main switch in the corresponding switching period. These designs limit the maximum power, transmitted to the output terminal. When designing the SMPS, the maximum limit current $I_{LIM}$ plays an important role in determining the rating of the used elements, such as that of secondary rectifying diodes.

However, setting the maximum limit current $I_{LIM}$ may not provide sufficient protection of the SMPS. For example, the actual main switch current Id varies according to an input voltage with a delay. The corresponding delay time may have several components, caused by different elements of the SMPS. The components include an internal propagation delay time of the SMPS and a turn-off delay time of the main switch. The delay time causes design problems because the rating of circuit elements of the SMPS needs to be selected according to the highest main switch current Id. Since the delay time may cause Id to exceed $I_{LIM}$, elements with higher ratings need to be used, leading to an increase in production cost.

FIG. 1 is a diagram illustrating a main switch current Id, flowing to a main switch of a typical SMPS, according to an input voltage Vin, in an ideal case with zero delay time.

As the input voltage Vin changes from a low voltage V1 to a high voltage V2, the slope of the main switch current Id increases. When the input voltage Vin assumes a low voltage V1, t1, a time to reach the maximum limit current $I_{LIM}$ is longer than t2, a time to reach a maximum limit current $I_{LIM}$ when the input voltage Vin assumes a high voltage V2.

As shown in FIG. 1, in the idealized case of zero delay time, the maximum of the main switch current Id essentially equals the maximum limit current $I_{LIM}$ regardless of the slope of the main switch current Id. Therefore, the maximum power transmitted to an output terminal is independent of the input voltage Vin.

FIG. 2 illustrates the main switch current Id in a typical SMPS for different input voltages Vin, in the case of finite delay times.

FIG. 2 shows a case when the delay time Δt is a finite constant, independent of the input voltage Vin. As seen earlier, the slope of the main switch current Id is approximately proportional to the input voltage Vin. Therefore, during the delay time Δt, the main switch current Id overshoots the maximum limit current $I_{LIM}$ by an amount which depends on the value of the input voltage Vin. For the higher input voltage V2 the overshoot is greater than for the lower input voltage V1.

The maximum of the main switch current Id will be referred to as the maximum limit current $I_{LIM}$. As shown in FIG. 2, the maximum limit current $I_{LIM2}$ in the case of a higher input voltage V2 can considerably exceed the maximum limit current $I_{LIM1}$, reached when the input voltage assumes its lower value V1. A difference in the maximum limit current flowing to a main switch on the primary side can cause a serious problem in that maximum output power of an output terminal is affected by the level of an input voltage.

In order to solve the problem, U.S. Pat. Nos. 6,674,656 and 6,665,197 disclose an SMPS including an additional circuit for uniformly controlling the maximum limit current $I_{LIM}$ to be independent of the input voltage, even when there is a finite delay time.

Currently, research to decrease the size and cost of an SMPS and an SMPS controller is being actively performed. However, the SMPS that is disclosed in U.S. Pat. Nos. 6,674,656 and 6,665,197 includes an additional circuit for uniformly controlling the maximum limit current $I_{LIM}$, such that it is difficult to achieve the decrease in size and cost of the SMPS and the SMPS controller.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include an SMPS and a corresponding switch which can maintain an essentially uniform maximum limit current across the main switch of the SMPS independent of the level of an input voltage, wherein the embodiments do not include a complex additional circuit.

An embodiment provides a switch including: a first transistor; a plurality of second transistors, each with a first node coupled to a first node of the first transistor; a first resistor with one terminal coupled to a second node of the first transistor and with the other terminal coupled to a first power source for supplying a first voltage, wherein a first current, which is a sum of currents flowing to each of the plurality of second transistors, sequentially changes from a time point at which the first transistor is turned on.

Another embodiment of the present invention provides a switch including: a plurality of first transistors; and a second transistor that is turned on/off by a control signal that is equal to that of the plurality of first transistors and in which a second current corresponding to a first current flowing to the plurality of first transistors flows, wherein a ratio of the first current to the second current sequentially changes from a time point at which the second transistor is turned on.

Yet another embodiment of the present invention provides a switch including: a first transistor; a plurality of second transistors, each with a first node coupled to a first node of the first transistor; a first resistor with one terminal coupled to a second node of the first transistor and with the other terminal coupled to a first power source for supplying a first voltage, wherein a distance between a second power source for supplying a second voltage to a second node of each of the plurality of second transistors and the second node of each of the plurality of second transistors is not uniform.

Yet another embodiment of the present invention provides an SMPS that generates a driving control signal for controlling operation of a switch according to an output voltage and that converts an input voltage into an output voltage, including: a first switch that is turned on/off according to the driving control signal; a plurality of second switches, each with a first node coupled to a first node of the first switch and that is turned on/off according to the driving control signal; a resistor with one terminal coupled to a second node of the first switch and with the other terminal coupled to a first power source for supplying the first voltage; a detection signal output terminal that outputs a detection signal corresponding to the first current flowing to the resistor; and a switching controller that receives the detection signal and a third voltage corresponding to a second voltage that is generated at an output terminal according to operation of the first and second switches to generate the driving control signal, wherein a ratio of a first current to a second current flowing to the plurality of second switches sequentially changes from a time point at which the first transistor is turned on.

DETAILED DESCRIPTION

Figure 1:
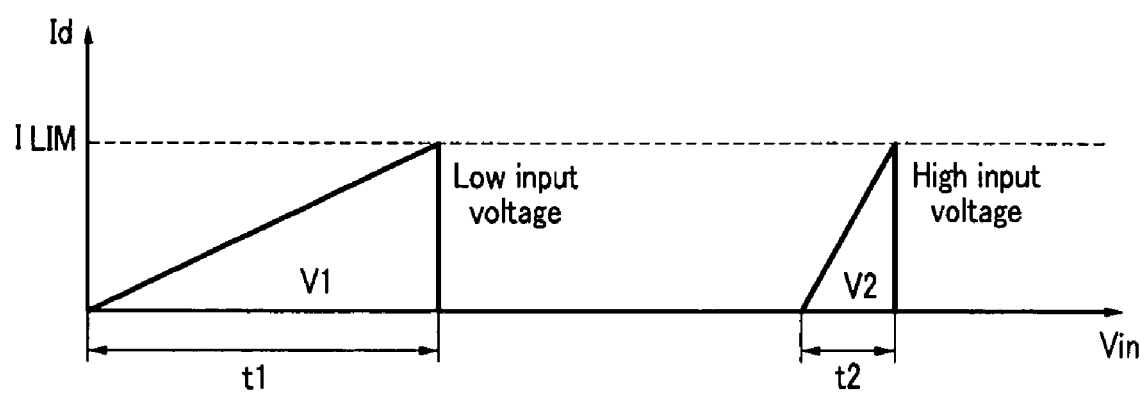
FIG. 1 is a diagram illustrating a main switch current Id as a function of an input voltage Vin in an ideal case of no delay time.
Figure 2:
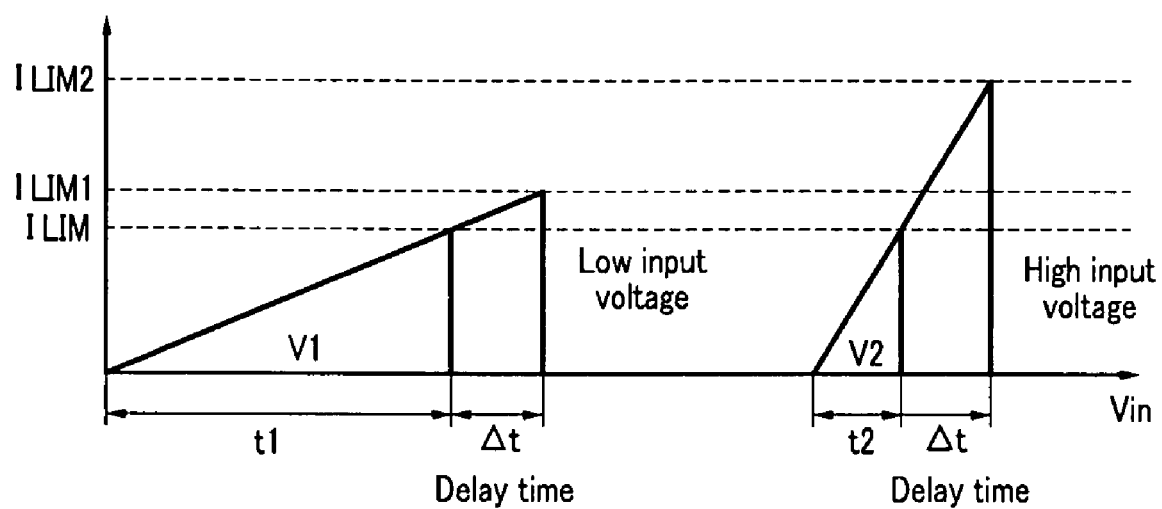
FIG. 2 is a diagram illustrating a main switch current Id as a function of an input voltage Vin in a case of a finite delay time.

In the following detailed description, only certain exemplary embodiments are shown and described, simply by way of illustration. As those skilled in the art realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Figure 3:
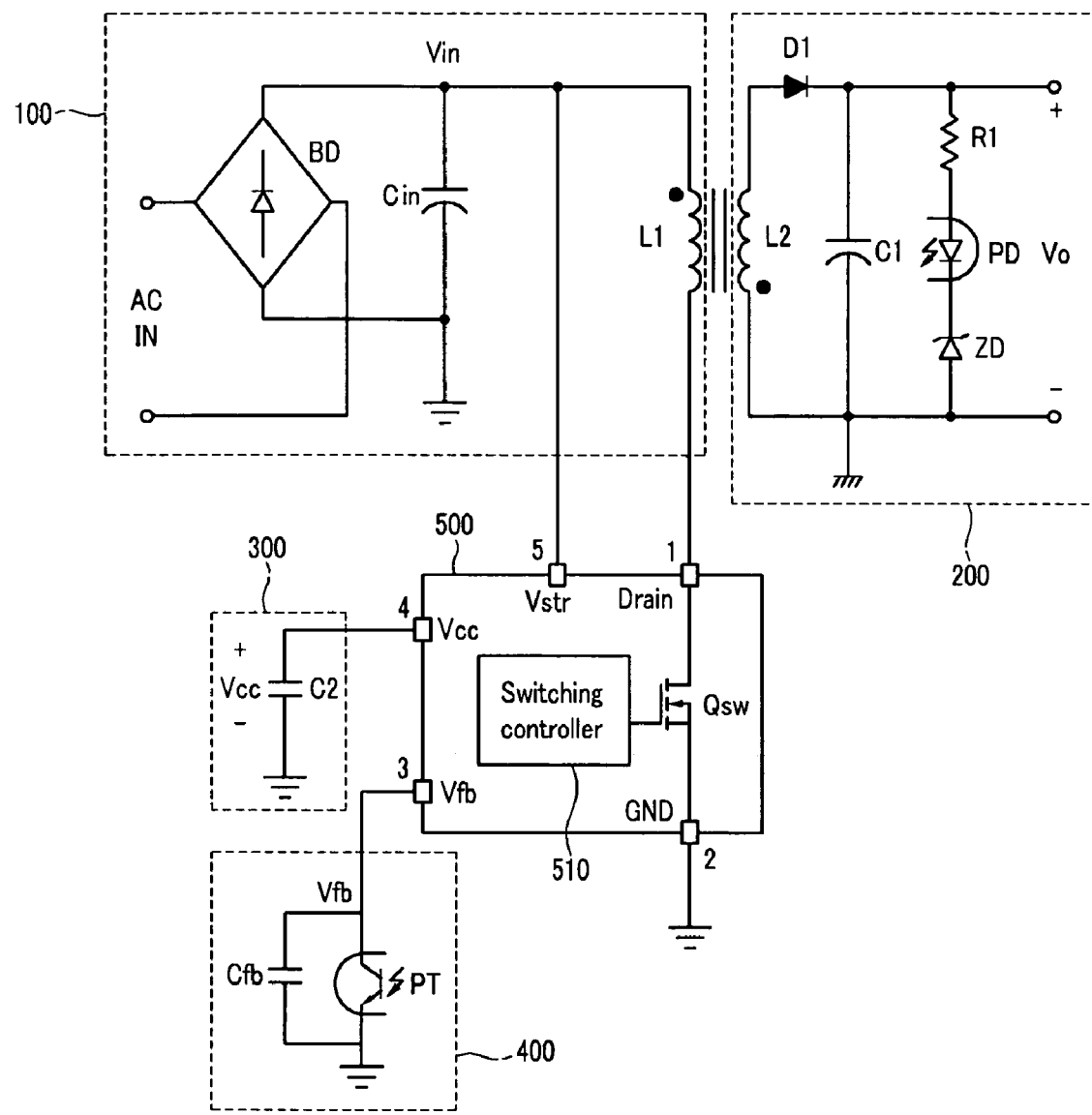
FIG. 3 is a diagram illustrating a configuration of an SMPS according to an exemplary embodiment.

FIG. 3 is a diagram illustrating a configuration of an SMPS according to an exemplary embodiment. The SMPS according to an exemplary embodiment may include a power supply unit 100, an output unit 200, a bias voltage supply unit 300, a feedback circuit 400, and an SMPS IC 500.

The power supply unit 100 may include a bridge diode BD for rectifying an ac input AC, a capacitor Cin for smoothing a rectified voltage, and a primary coil L1 of a transformer with a first terminal coupled to the capacitor Cin.

The output unit 200 may include a diode D1 with its anode coupled to one terminal of a secondary coil L2 of the transformer, a capacitor C1 that is coupled between a cathode of the diode D1 and a ground, a resistor R1 with one terminal coupled to the cathode of the diode D1, a photodiode PD with its anode coupled to the other terminal of the resistor R1, and a zener diode ZD with its cathode coupled to a cathode of the photodiode PD and with its anode coupled to a ground terminal. Here, a voltage across the capacitor C1 will be referred to as an output voltage Vo. The current flowing to the photodiode PD depends on the output voltage Vo. The photodiode PD, together with a phototransistor PT of the feedback circuit 400, constitutes a photocoupler and provides information about the output voltage Vo to the feedback circuit 400.

The bias voltage supply unit 300 may include a capacitor C2 that is coupled between a ground terminal and a bias voltage input terminal (I/O #4) of the SMPS IC 500. The bias voltage supply unit 300 may supply a bias voltage Vcc—charged to the capacitor C2—to the bias voltage input terminal (I/O #4) of the SMPS IC 500.

The feedback circuit 400 may include the phototransistor PT for forming a photocoupler together with the photodiode PD of the output unit 200, and a feedback capacitor Cfb that is coupled in parallel to the phototransistor PT. The feedback circuit 400 may supply a feedback voltage Vfb—charged to the capacitor Cfb—to a feedback voltage input terminal (I/O #3) of the SMPS IC 500. The phototransistor PT can be driven by a current flowing through the photodiode PD of the output unit 200, whereby if the output voltage Vo rises, the feedback voltage Vfb decreases, and if the output voltage Vo decreases, the feedback voltage Vfb rises.

The SMPS IC 500 may include a switching controller 510 and a switching transistor Qsw, and can have five input and output terminals. These terminals may include a drain terminal (I/O #1), a ground GND terminal (I/O #2), a feedback voltage Vfb input terminal (I/O #3), a bias voltage input terminal (I/O #4), and a start voltage Vstr input terminal (I/O #5). The drain terminal (I/O #1) can be coupled to a second terminal of a primary coil L1 of the transformer, and the ground GND terminal (I/O #2) can be coupled to a ground terminal. The feedback voltage Vfb input terminal (I/O #3) can be coupled to a shared node of the phototransistor PT and the capacitor Cfb, and the bias voltage input terminal (I/O #4) can be coupled to one terminal of the capacitor C2. Further, the start voltage Vstr input terminal (I/O #5) can be coupled to a shared node of the capacitor Cin and the primary coil L1 of the transformer.

Figure 4:
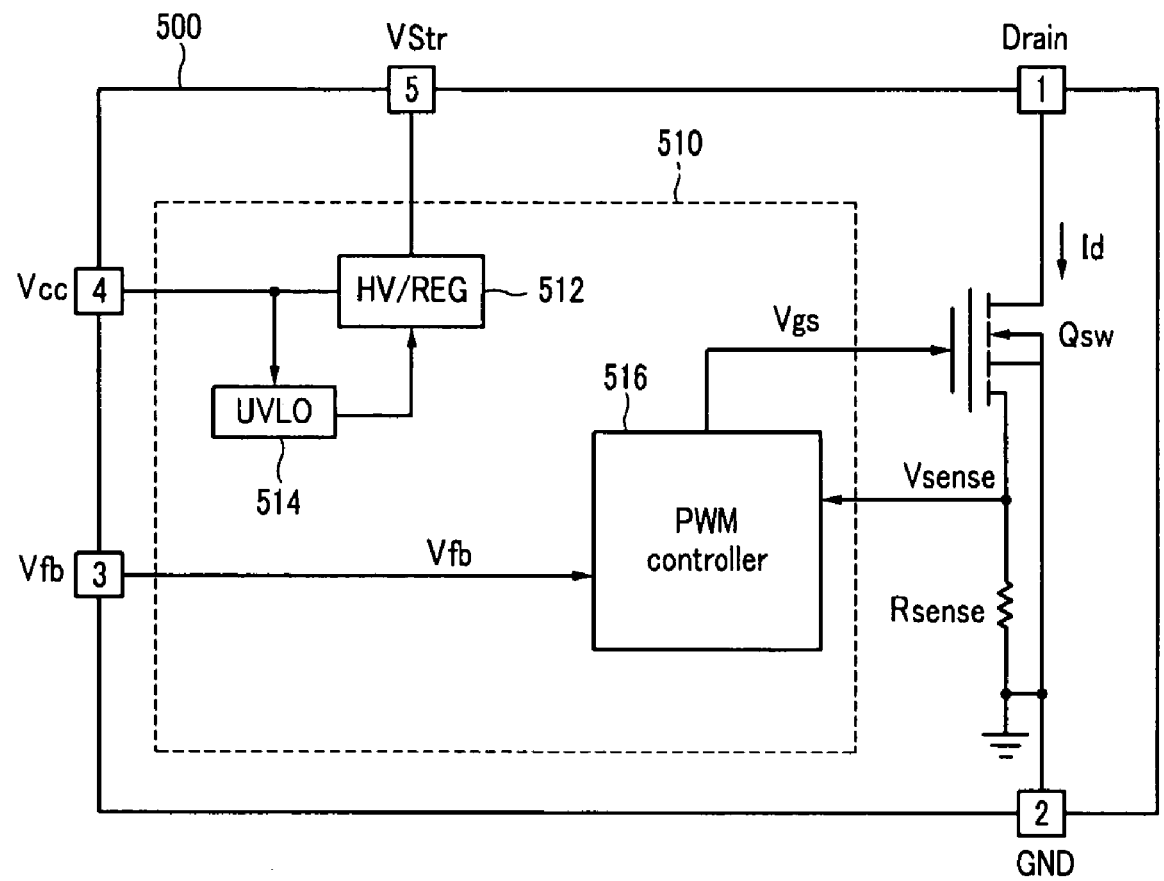
FIG. 4 is a diagram illustrating an SMPS IC 500 according to an exemplary embodiment.

FIG. 4 is a diagram illustrating an SMPS IC 500 according to an exemplary embodiment. The SMPS IC 500 may include a switching controller 510 and a switching transistor Qsw. The switching controller 510 may include a high voltage regulator (hereinafter referred to as an "HV/REG") 512, an undervoltage lockout (hereinafter referred to as a "UVLO") 514, and a PWM controller 516.

The HV/REG 512 can transmit a current corresponding to a voltage that is input through the start voltage Vstr input terminal (I/O #5) to the capacitor C2 of the bias voltage supply unit 300 through the bias voltage input terminal (I/O #4), thereby generating a bias voltage Vcc.

The UVLO 514 can detect a voltage level of a bias voltage. One of the functions of the UVLO is to stop the switching controller 510 if a bias voltage is lower than a preset voltage level. Because a bias voltage is used as a voltage for driving the switching controller 510, when a bias voltage falls to or below a predetermined level, the switching controller 510 may operate erroneously. Therefore, the UVLO 514 stops the switching controller 510 if a bias voltage becomes lower than a preset voltage level, thereby preventing erroneous operation of the switching controller 510.

The PWM controller 516 can receive a detection signal Vsense and a feedback voltage Vfb that is input through the feedback voltage Vfb input terminal (I/O #3) to generate a gate control signal Vgs for controlling the on/off operations of the switching transistor Qsw. The PWM controller 516 can compare a feedback voltage Vfb with a detection signal Vsense, thereby determining the time instant of the switch turn-off. Further, the PWM controller 516 can turn on the switching transistor Qsw using an internal clock signal having a predetermined period. Alternatively, after the switching transistor Qsw is turned off, at the lowest point of a resonance waveform that exists between the terminals of the switching transistor Qsw, the switching transistor Qsw may be turned on. However, embodiments can also turn on the switching transistor Qsw at any other time instant suitable to reduce the switching losses in addition to the lowest point of a resonance waveform.

The switching transistor Qsw can be turned on/off according to the gate control signal Vgs that is input from the PWM controller 518 to a control electrode of the switching transistor Qsw. A drain of the switching transistor Qsw can be coupled to the drain (Drain) terminal (I/O #1) and a source thereof can be coupled to the ground GND terminal (I/O #2).

The switching transistor Qsw can be a sense field effect transistor (FET) having a second source terminal in which a sense current Isense flows, corresponding to a drain-source current of the switching transistor Qsw. The second source terminal of the switching transistor Qsw can be coupled to a ground terminal through a resistor Rsense, thus generating a sense voltage Vsense across the resistor Rsense.

Hereinafter, the switching transistor Qsw will be referred to as a sense FET. The embodiment of FIG. 4 displays such a sense FET. In other embodiments this sense FET can be replaced by another switch that has a similar structure and that performs the same operation. Further, in FIG. 4, the switching controller 510 and the switching transistor Qsw are embodied as one package, but in other embodiments they can be formed separately.

Figure 5:
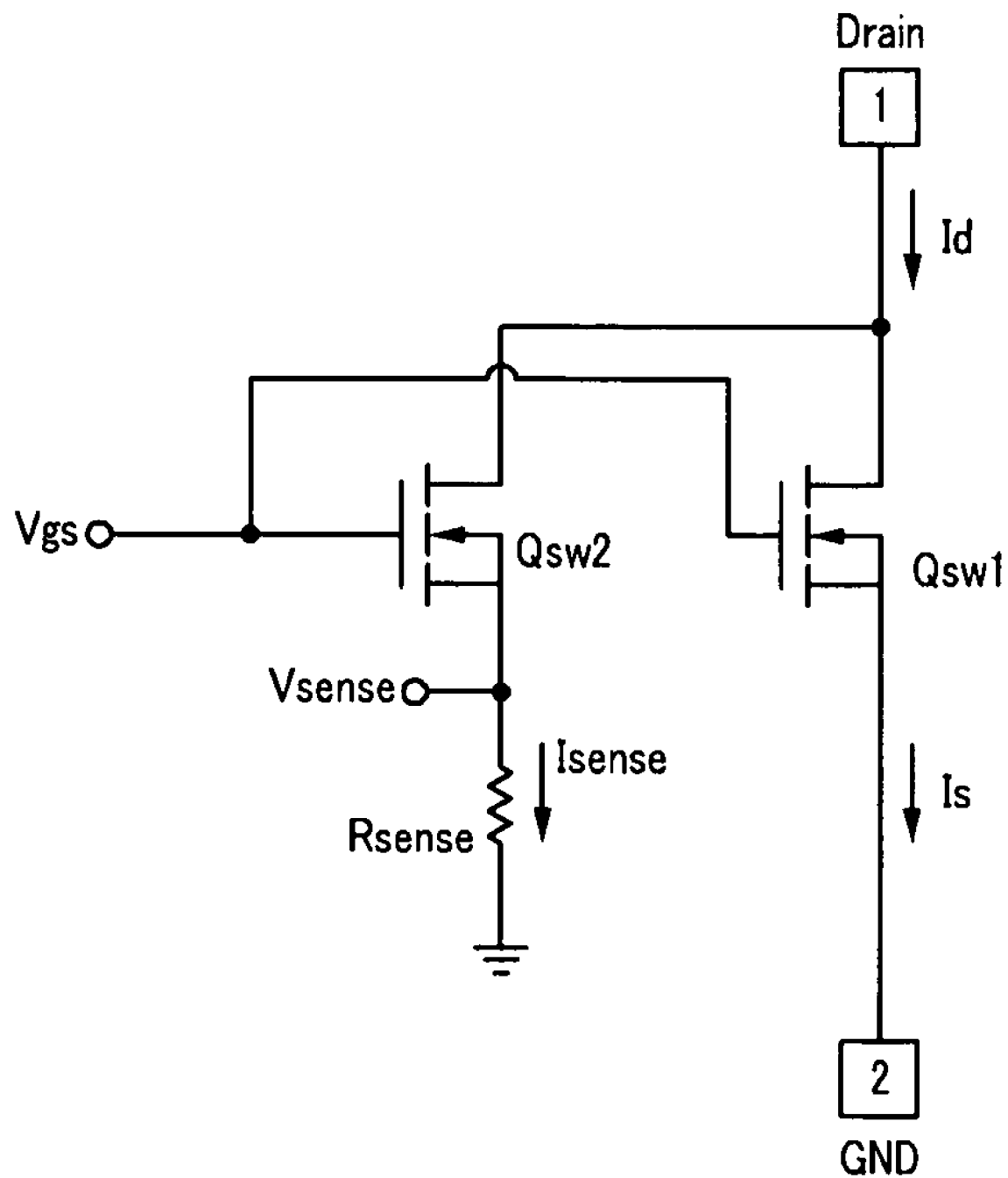
FIG. 5 is a diagram illustrating a sense FET in detail according to an exemplary embodiment.

FIG. 5 illustrates an embodiment of a sense FET. The sense FET can be formed with a switching transistor Qsw1 and a switching transistor Qsw2 with drains that are commonly coupled to the drain terminal (I/O #1). The switching transistors can be simultaneously turned on/off according to a gate control signal Vgs that is input from the PWM controller 518 of the switching controller 510 to a control electrode. A source of the switching transistor Qsw1 is coupled to a ground GND terminal (I/O #2), and a source of the switching transistor Qsw2 is coupled to a ground terminal through the resistor Rsense.

The sense current Isense flowing at the source of the switching transistor Qsw2 can be much smaller than a source current Is flowing at the source of the switching transistor Qsw1 because the switching transistor Qsw1 is formed to be much larger than the switching transistor Qsw2. Hereinafter, for better comprehension and ease of description, it is assumed that the switching transistor Qsw1 includes a plurality of sub-transistors. The size of each sub-transistor is same with the switching transistor Qsw2.

A sense FET may have a sequentially changing sense ratio after being turned on, whereby a ratio of the source current Is to the sense current Isense changes, as described with reference to FIGS. 6 to 9.

Here, a sense ratio (hereinafter referred to as "SR") may indicate a ratio of a source current Is to the sense current Isense. SR is represented by Equation 1. Note that if the sense current Isense is much smaller than the source current Is, then the source current is well approximated by the main switch current Id, flowing at the drain of the sense FET. With this approximation:

$$SR = \frac{I_s}{I_{sense}} \approx \frac{I_d}{I_{sense}} = \frac{I_d}{V_{sense}} \times R_{sense} \quad (1)$$

Figure 6:
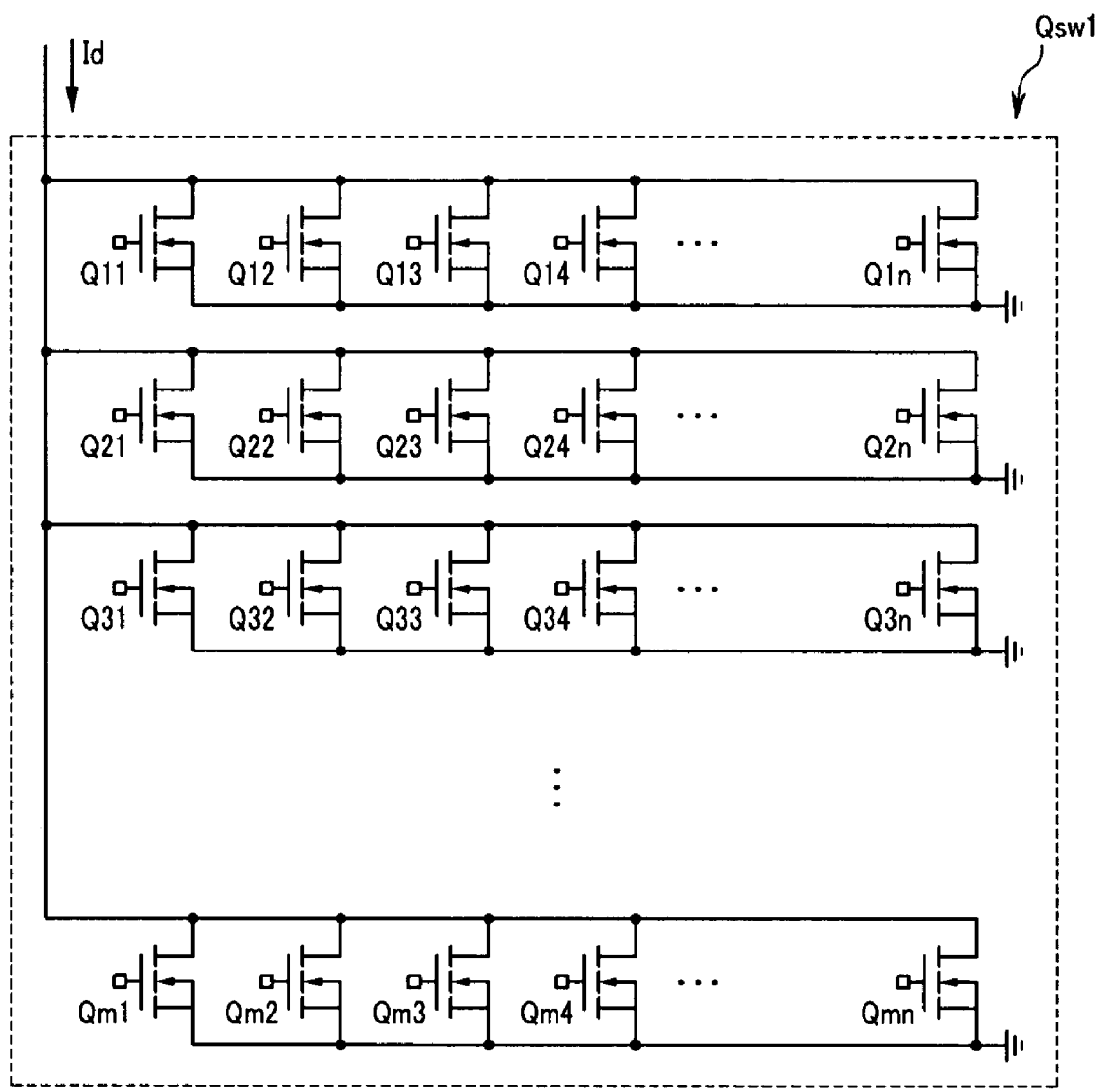
FIG. 6 is a diagram illustrating a switching transistor Qsw1 in detail according to an exemplary embodiment.

FIG. 6 illustrates a switching transistor Qsw1 in detail in some embodiments. The switching transistor Qsw1 may include a plurality of transistors Q11-Qmn. In some embodiments the transistors may form rows: the drains of a first transistor group Q11-Q1$n$ can be coupled into a first shared line, as well as the sources of the same transistors can be coupled into a first shared ground. The same can be implemented in a second transistor group Q21-Q2$n$, a third transistor group Q31-Q3$n$, ..., and an m-th transistor group Qm1-Qmn.

Figure 7:
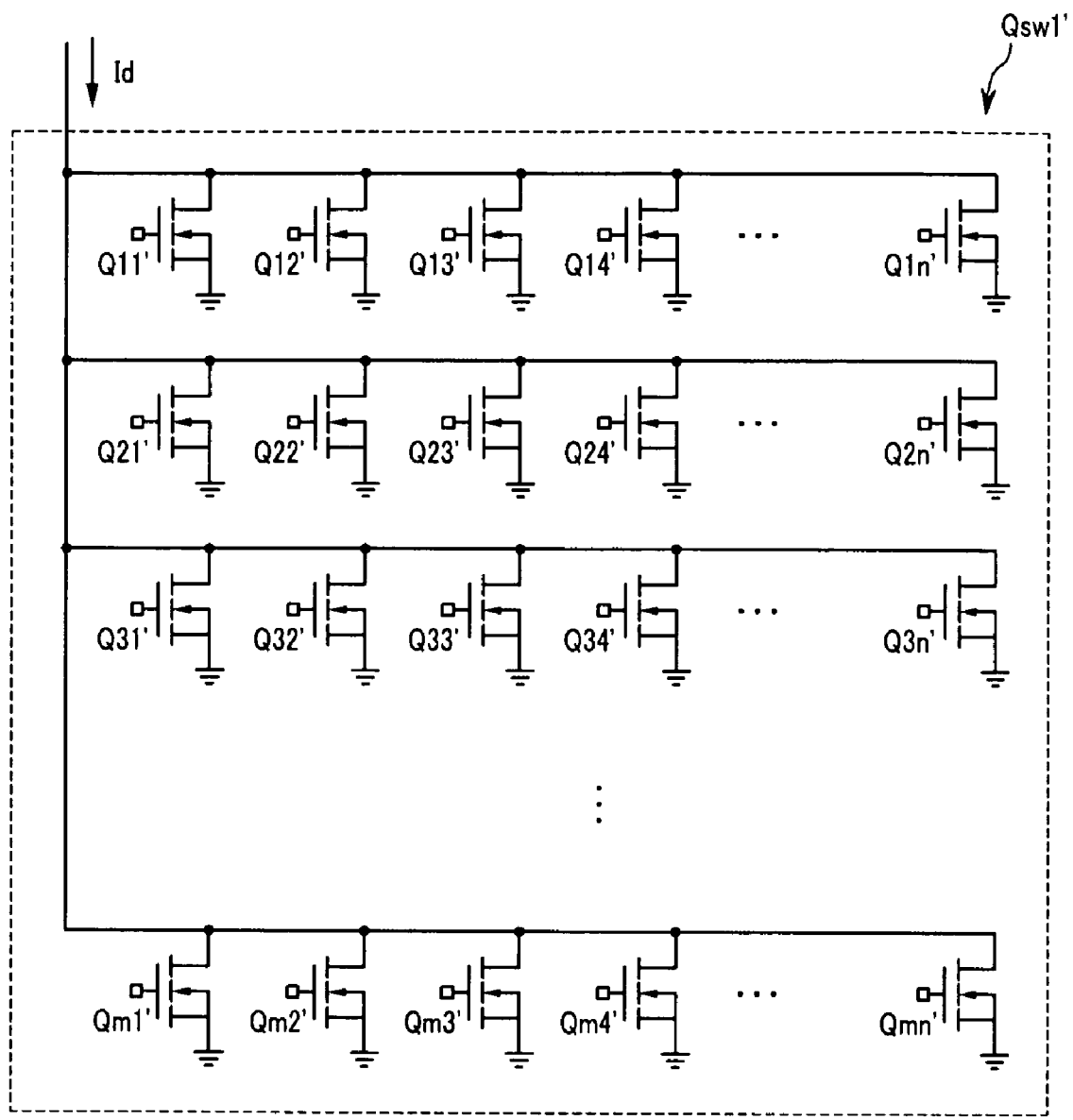
FIG. 7 is a diagram illustrating a switching transistor Qsw1' that is included in a general SMPS.

FIG. 7 illustrates another embodiment Qsw1' of the switching transistor. Unlike in the switching transistor Qsw1 in FIG. 6, in the switching transistor Qsw1' in FIG. 7, sources of each of a plurality of sub-transistors Q11'-Qmn' are individually coupled to a ground terminal. Embodiments of this type are implemented in some typical SMPS.

The switching transistor Qsw1 is formed differently from the switching transistor Qsw1' as it will be now explained. In the switching transistor Qsw1, when moving from sub-transistors Q1$n$, Q2$n$, Q3$n$, ..., Qmn that are closest a ground terminal to sub-transistors Q11, Q21, Q31, ..., Qm1 that are farthest from the ground terminal, a parasitic capacitance between their source and their ground terminal increases. Accordingly, when the switching transistor Qsw1 is turned on, the sub-transistors are turned on sequentially: the sub-transistors Q1$n$, Q2$n$, Q3$n$, ..., Qmn closest to the ground terminal turn on first and the sub-transistors Q11, Q21, Q31, ..., Qm1 farthest from the ground terminal turn on last. The reason the sub-transistors Q1$n$, Q2$n$, Q3$n$, ..., Qmn are turned on in sequence is because the variance of their parasitic capacitance is increasing, due to the distance between their source and their ground terminals.

In contrast, in the switching transistor Qsw1' of FIG. 7, that is included in some typical SMPS, the parasitic capacitance between the source and the corresponding ground terminal of the sub-transistors Q11'-Qmn' is uniform. Accordingly, when the switching transistor Qsw1' is turned on, all sub-transistors Q11'-Qmn' are turned on essentially simultaneously.

Figure 8:
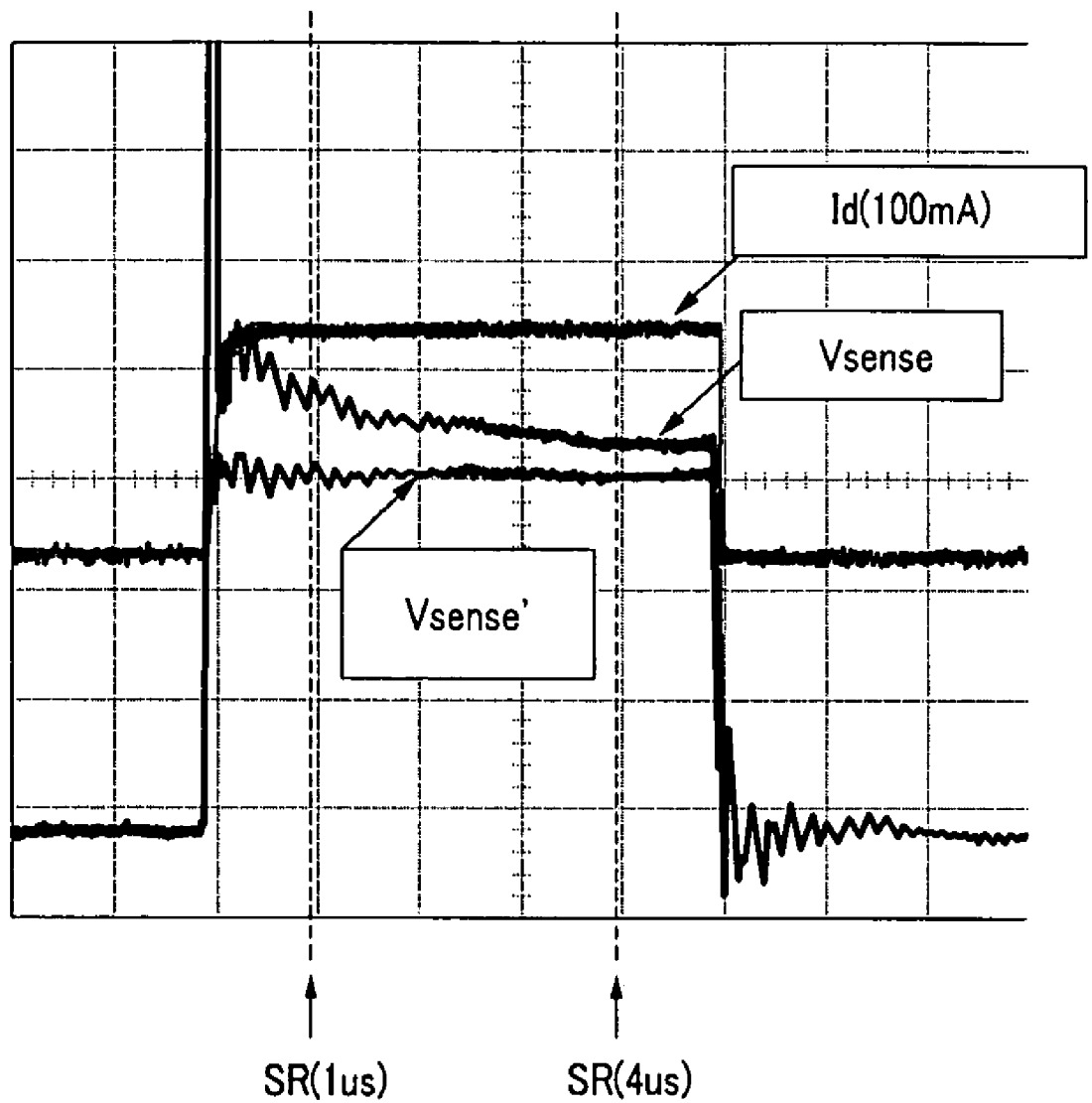
FIG. 8 is a diagram illustrating a change of a detection signal Vsense of a sense FET according to an exemplary embodiment and a detection signal Vsense' of a sense FET that is included in a general SMPS from a time point at which the sense FET is turned on to a time point at which the sense FET is turned off.

FIG. 8 illustrates the time dependent waveform of the sense voltage Vsense of the embodiment of FIG. 6 and that of the sense voltage Vsense' of the embodiment of FIG. 7, from a turn-on time to a turn-off time of the sense FET. In this figure the main switch current Id is about 100 mA.

The sense voltage Vsense is bigger than Vsense' at the time when the sense FET is turned on. After the turn-on of the sense FET, Vsense sequentially decreases towards the value of Vsense'. Because of the inverse relation between Vsense and the sense ratio SR, SR grows with time in the embodiment of FIG. 6. In particular, the sense ratio SR 1 µs after the transistor Qsw2 was turned on is smaller than the SR 4 µs after the transistor Qsw2 was turned on.

Next, it will be explained why the sense voltage Vsense changes sequentially, as shown in FIG. 8. As described above, the source-ground parasitic capacitance is different for different sub-transistors Q11-Qmn, which constitute the switching transistor Qsw1. Accordingly, the sub-transistors Q11-Qmn turn on sequentially, starting with the sub-transistor closest to the ground terminal and moving on to the sub-transistor that is farthest from the ground terminal. The switching transistor Qsw2 turns on at a time at which the sub-transistor, closest to the ground terminal, turns on. This causes the SR of the sense FET to change as well.

The number of sub-transistors Q11-Qmn, constituting the switching transistor Qsw1 can be about 100 in some embodiments. At the turn-on time of the switching transistor Qsw2 e.g. 10 sub-transistors may be turned on. 1 µs after the turn-on time of the switching transistor Qsw2 e.g. 20 sub-transistors may be turned on, and 4 µs after the turn-on time of the switching transistor Qsw2 e.g. 100 transistors may be turned on. In other embodiments, different number of sub-transistors maybe turned on at different times. Also, the switching transistor Qsw1 may include a different number of sub-transistors.

Next, the SR will be calculated from Equation 1 using the above numbers, as follows. First, at the turn-on time of the switching transistor Qsw2, a ratio of the number of sub-transistors that are turned on in the switching transistor Qsw2 and in the switching transistor Qsw1 is 1:10.

Therefore, the sense current Isense of the switching transistor Qsw2 is about 1/10 of the main switch current Id of the sense FET. In the case of the main switch current Id being about 100 MA, at the time at which the switching transistor Qsw2 turns on, the sense current Isense is about 10 mA and the SR is about 10.

Approximately 1 µs after the turn-on time of the switching transistor Qsw2 the sense current Isense becomes about 1/20 of the main switch current Id, or about 5 mA, and the SR becomes about 20.

Approximately 4 µs after the turn-on time of the switching transistor Qsw2 the sense current Isense becomes about 1/100 of the main switch current Id, or about 1 mA, and the SR becomes about 100.

Visibly, the SR of the sense FET sequentially increases from the turn-on time of the switching transistor Qsw2. This is because, although the main switch current Id is assumed to be constant, the sense current Isense and the sense voltage Vsense of the switching transistor Qsw2 sequentially decrease from the turn-on time of the switching transistor Qsw2. Hereinafter, a value of sense voltage Vsense corresponding to a maximum limit current $I_{LIM}$ of the SMPS IC 500 is referred to as "Vsense*". The main switch current Id of the sense FET corresponding to the Vsense* gradually increases from a turn-on time of the switching transistor Qsw2.

In other words, the sense voltage Vsense reaches the Vsense* at a low value of drain current Id when a level of an input voltage is high, and the sense voltage Vsense reaches the Vsense* at a high value of drain current Id when a level of the input voltage is low. As a result, by controlling the time that the sense voltage Vsense reaches the Vsense* to be inversely proportional to the input voltage, a maximum drain current of the SMPS IC 500 and a maximum power can be uniformly controlled regardless of the input voltage, even when a delay time is taken into consideration.

As shown in FIG. 8, the sense voltage Vsense of the embodiment of FIG. 6 has a value higher than the sense voltage Vsense' of FIG. 7 due to a low SR at the turn-on time of the switching transistor Qsw2. When the input voltage Vin is high, the current Id rapidly increases if an output terminal is short-circuited or an overload is applied to an output terminal. In this case, the PWM controller 518 of the switching controller 510 receives an increased sense voltage Vsense that is higher than a sense voltage Vsense corresponding the actual current Id due to a low SR, and compares the sense voltage Vsense to a Vsense*. Therefore, the PWM controller 518 determines that the main switch current Id reached the maximum limit current $I_{LIM}$ earlier than when an actual Id reached the $I_{LIM}$, because the increased sense voltage Vsense reaches Vsense* earlier than a time a sense voltage Vsense corresponding the actual current Id reaches Vsense*. In response, the PWM controller 518 and advances a turn-off time of the sense FET.

The SR of the embodiment of FIG. 6 sequentially increases from the turn-on time of the switching transistor Qsw2. When the input voltage Vin is low, if an output terminal is short-circuited or an overload is applied to an output terminal, the main switch current Id increases with a small slope. In this case, the SR increases slowly, and the PWM controller 518 determines that the main switch current Id reached the maximum limit current $I_{LIM}$ later than a time that a current Id reached the $I_{LIM}$ when the input voltage Vin is high. Therefore, the PWM controller 518 delays a turn-off time of the sense FET later than a turn-off time when the input voltage Vin is high.

Figure 9:
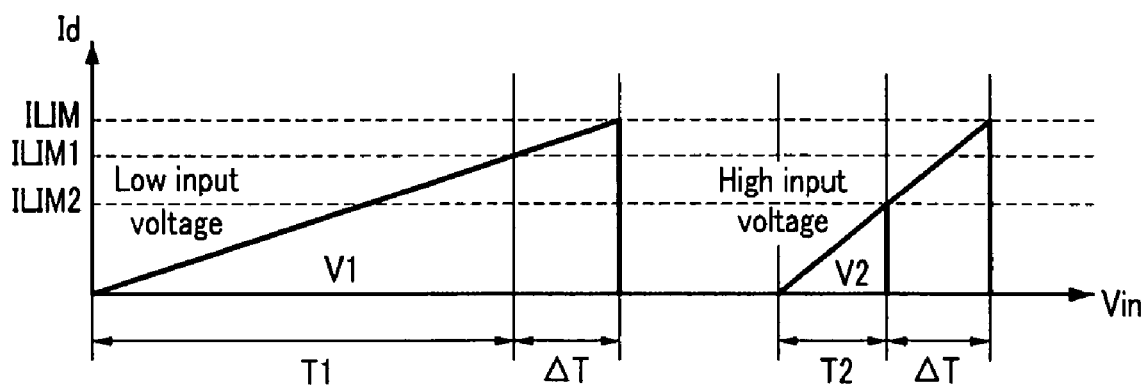
FIG. 9 is a diagram illustrating a current Id flowing to a sense FET of an SMPS according to an exemplary embodiment corresponding to the change of an input voltage Vin.

FIG. 9 is a diagram illustrating the main switch current Id corresponding to the change of an input voltage Vin. As the input voltage Vin changes from a low voltage V1 to a high voltage V2, the slope of the main switch current Id increases. When the input voltage Vin assumes the high voltage V2, due to the change of the SR as described above, the PWM controller 518 determines as if the main switch current Id reaches the preset maximum limit current $I_{LIM}$ earlier. At this time the PWM controller 516 turns off the sense FET by changing a gate control signal Vgs, and the sense FET is turned off after a delay time ΔT. This delay time can be caused by an internal propagation delay of the PWM controller 516 and a turn-off delay of the sense FET. As a result, the main switch current Id rises up to $I_{LIM}$.

If the input voltage Vin changes from the high voltage V2 to a low voltage V1, the slope of the main switch current Id becomes smaller. Therefore, the PWM controller 518 determines as if the main switch current Id reaches the maximum limit current $I_{LIM}$ later than in the case of high input voltage V2. That is, the PWM controller 516 turns off the sense FET by changing a gate control signal Vgs later than a time when the input voltage Vin is a high voltage V2. Despite of the later turn off, the main switch current Id rises in a lower slope than when the input voltage Vin is a high voltage V2 during an equal delay time ΔT, and the main switch current Id rises up to $I_{LIM}$ that is same with when the input voltage Vin is a high voltage V2.

FIG. 9 illustrates that embodiments reach the same maximum limit current $I_{LIM}$ independent of the input voltage Vin by starting the turn-off at a higher limit current $I_{LIM1}$ for a lower input voltage V1, and at a lower limit current $I_{LIM2}$ for a higher input voltage V2. In both cases the main switch current Id stops growing after a delay time ΔT. The slope of the main switch current Id is smaller for the lower input voltage V1 and higher for the higher input voltage V2. $I_{LIM}$, the maximum value of the main switch current Id equals the limit current where the turn-off happened plus the slope of Id multiplied with the delay time ΔT. With a properly chosen limit currents $I_{LIM1}$ and $I_{LIM2}$ the main switch current Id reaches the same limit maximum limit current $I_{LIM}$.

Embodiments are not limited to flyback type SMPSs, shown in FIGS. 3 and 4. Rather, embodiments encompass all kinds of SMPSs, including SMPSs that do not include a transformer.

In some embodiments, the structure of the switching transistor Qsw1 had the structure, which caused a sense ratio gradually change from a turn-on time. This structure made it possible that the maximum limit current $I_{LIM}$ of the main switch current Id can be essentially independent of the input voltage Vin without including an additional circuit for controlling the maximum limit current $I_{LIM}$ to be inversely proportional to a level of an input voltage. Accordingly, output power that is output through the output unit 200 can be kept essentially constant. Therefore, in embodiments no additional circuit is needed for controlling the maximum limit current $I_{LIM}$. This allows the reduction of the manufacturing costs and the size of the SMPS.

While embodiments have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switch comprising:
   a first transistor;
   a plurality of second transistors, each having a first node coupled to a first node of the first transistor;
   a first resistor with one terminal coupled to a second node of the first transistor and with the other terminal coupled to a first power source for supplying a first voltage,
   wherein a first current, which is the sum of currents flowing to the plurality of second transistors, sequentially changes from a time point at which the first transistor is turned on;
   wherein a distance between a second power source for supplying a second voltage to a second node of each of the plurality of second transistors and the second node of each of the plurality of second transistors is not uniform;
   wherein when the plurality of second transistors is turned on, the plurality of second transistors is sequentially turned on starting from the second node of the plurality of second transistors closest to the second power source.

2. The switch of claim 1, wherein a ratio of the first current to a current flowing to the first transistor sequentially increases from a time point at which the first transistor is turned on.

3. The switch of claim 2, wherein the first and second voltage have the same voltage level.

4. The switch of claim 3, wherein the first and second voltages are a ground voltage.

5. A switch comprising:
   a plurality of first transistors; and
   a second transistor that is turned on/off by a control signal that is equal to that of the plurality of first transistors and in which a second current corresponding to a first current flowing to the plurality of first transistors flows,
   wherein a ratio of the first current to the second current sequentially changes from a time at which the second transistor is turned on;
   wherein a first node of the plurality of first transistors and the first node of the second transistor are coupled in parallel, and a distance between a second node of each of the plurality of first transistors and a first power source for supplying the first voltage is not uniform;
   wherein when the plurality of first transistors is turned on, the plurality of first transistors is sequentially turned on starting from the second node of the plurality of first transistors close to the first power source.

6. The switch of claim 5, wherein a ratio of the first current to the second current sequentially increases from a time at which the second transistor is turned on.

7. The switch of claim 5, wherein a number of transistors that are turned on among the plurality of first transistors sequentially increases from a time at which the second transistor is turned on.

8. The switch of claim 5, further comprising a sense voltage output terminal for outputting the first voltage corresponding to the second current flowing to a resistor that is coupled between the second node of the second transistor and the first power source.

9. The switch of claim 8, wherein the first voltage is a ground voltage.

10. A switch comprising:
    a first transistor;
    a plurality of second transistors, having a first node coupled to a first node of the first transistor; and
    a first resistor with one terminal coupled to a second node of the first transistor and with the other terminal coupled to a first power source for supplying a first voltage,
    wherein a distance between a second power source for supplying a second voltage to a second node of each of the plurality of second transistors and the second node of each of the plurality of second transistors is not uniform;
    wherein when the plurality of second transistors are turned on, the plurality of second transistors is sequentially turned on starting from the second node of the plurality of second transistors close to the second power source.

11. The switch of claim 10, wherein a first current flowing to the first transistor corresponds to a second current flowing to the plurality of second transistors, and a ratio of the second current to the first current sequentially changes from a time point at which the first transistor is turned on.

12. The switch of claim 11, wherein a ratio of the second current to the first current sequentially increases from a time point at which the first transistor is turned on.

13. The switch of claim 10, wherein the first and second voltages have the same voltage level.

14. The switch of claim 13, wherein the first and second voltages are a ground voltage.

15. A switching mode power supply that generates a driving control signal for controlling operation of a switch according to an output voltage and that converts an input voltage into an output voltage, comprising:
    a first switch that is turned on/off according to the driving control signal;
    a plurality of second switches, each with a first node coupled to a first node of the first switch and that is turned on/off according to the driving control signal;
    a resistor with one node coupled to a second node of the first switch and with the other node coupled to a first power source for supplying the first voltage;

a detection signal output terminal that outputs a detection signal corresponding to the first current flowing to the resistor; and a switching controller that receives the detection signal and a third voltage corresponding to a second voltage that is generated at an output terminal according to operation of the first and second switches to generate the driving control signal, wherein a ratio of a first current to a second current flowing to the plurality of second switches sequentially changes from a time point at which the first transistor is turned on.

16. The switching mode power supply of claim 15, wherein a ratio of the first current to the second current sequentially decreases from a time point at which the first switch is turned on.

17. The switching mode power supply of claim 16, wherein the switching controller turns off the first and second switches at a time point at which capacity of the second current decreases as an input voltage rises according to the change of a ratio of the first current to the second current.

18. The switching mode power supply of claim 17, wherein a second node of each of the plurality of second switches is coupled to a second power source for supplying a fourth voltage, and a distance between the second node of each of the plurality of second transistors and the second power source is not uniform.

19. The switching mode power supply of claim 18, wherein when the plurality of second switches are turned on, the plurality of switches is sequentially turned on starting from the second node of the plurality of second transistors close to the second power source.

20. The switching mode power supply of claim 18, wherein the first and fourth voltages have the same voltage level.

21. The switching mode power supply of claim 20, wherein the first and fourth voltages are a ground voltage.

* * * * *